(12) United States Patent
Chen et al.

(10) Patent No.: US 11,145,213 B2
(45) Date of Patent: Oct. 12, 2021

(54) METHOD AND SYSTEM FOR DISPLAYING OBSTACLE DETECTION (71) Applicant: SZ DJI TECHNOLOGY CO., LTD., Shenzhen (CN)

(72) Inventors: Yi Chen, Shenzhen (CN); Zhuo Guo, Shenzhen (CN); Jieming Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 156 days.

(21) Appl. No.: 16/296,740

(22) Filed: Mar. 8, 2019

(65) Prior Publication Data

US 2019/0206269 A1    Jul. 4, 2019

Related U.S. Application Data

(63) Continuation of application No. PCT/CN2016/098618, filed on Sep. 9, 2016.

(51) Int. Cl.
| | | |
|---|---|---|
| *G08G 5/04* | (2006.01) | |
| *G08G 5/00* | (2006.01) | |
| *B64C 39/02* | (2006.01) | |
| *G06T 11/60* | (2006.01) | |
| *H04N 7/18* | (2006.01) | |

(52) U.S. Cl.
CPC ............. *G08G 5/04* (2013.01); *B64C 39/024* (2013.01); *G06T 11/60* (2013.01); *G08G 5/0013* (2013.01); *G08G 5/0069* (2013.01); *G08G 5/045* (2013.01); *H04N 7/185* (2013.01); *B64C 2201/127* (2013.01); *B64C 2201/146* (2013.01)

(58) Field of Classification Search
CPC ...... G08G 5/04; G08G 5/0013; G08G 5/0069; G08G 5/045; B64C 39/024; B64C 2201/127; B64C 2201/146; G06T 11/60; H04N 7/185
See application file for complete search history.

(56) References Cited

U.S. PATENT DOCUMENTS

| | | | |
|---|---|---|---|
| 9,443,435 B2 * | 9/2016 | Baudson | G06T 19/006 |
| 9,472,109 B2 * | 10/2016 | Starr | G08G 5/0073 |
| 9,752,893 B2 * | 9/2017 | Mohideen | G01C 23/005 |
| 9,817,396 B1 * | 11/2017 | Takayama | G06K 9/00637 |
| 10,302,759 B1 * | 5/2019 | Arteaga | G08G 5/0082 |

(Continued)

FOREIGN PATENT DOCUMENTS

| | | |
|---|---|---|
| CN | 101489117 A | 7/2009 |
| CN | 201681466 U | 12/2010 |

(Continued)

OTHER PUBLICATIONS

World Intellectual Property Organization (WIPO) International Search Report for PCT/CN2016/098618 dated May 3, 2017 6 Pages.

*Primary Examiner* — James J Lee
*Assistant Examiner* — Tawri M Matsushige
(74) *Attorney, Agent, or Firm* — Anova Law Group, PLLC (57) ABSTRACT

A method for displaying obstacle detection for an unmanned aerial vehicle (UAV) includes receiving obstacle information associated with at least one direction of the UAV. The obstacle information is obtained by analyzing a sensing signal of at least one sensor of the UAV. The method further includes displaying the obstacle information.

16 Claims, 7 Drawing Sheets

(56) References Cited

U.S. PATENT DOCUMENTS

| | | | | |
|---|---|---|---|---|
| 2005/0200502 | A1* | 9/2005 | Reusser | G01C 23/00 340/973 |
| 2010/0145610 | A1* | 6/2010 | Bacabara | G01C 23/005 701/532 |
| 2010/0250022 | A1* | 9/2010 | Hines | G05D 1/0094 701/2 |
| 2012/0203450 | A1* | 8/2012 | Meyer | G08G 5/045 701/301 |
| 2013/0332062 | A1* | 12/2013 | Kreitmair-Steck | G01S 13/933 701/301 |
| 2015/0298017 | A1* | 10/2015 | Curley | A63H 27/001 446/37 |
| 2015/0321758 | A1* | 11/2015 | Sarna, II | B64C 39/024 244/63 |
| 2016/0139595 | A1* | 5/2016 | Yang | G05D 1/0016 701/2 |
| 2016/0306351 | A1* | 10/2016 | Fisher | G05D 1/0016 |
| 2017/0124887 | A1* | 5/2017 | Hornych | G01S 7/6218 |
| 2017/0242429 | A1* | 8/2017 | Raz | G05D 1/0016 |
| 2017/0263138 | A1* | 9/2017 | O'Day | G08G 5/0013 |

FOREIGN PATENT DOCUMENTS

| | | |
|---|---|---|
| CN | 102812704 A | 12/2012 |
| CN | 103080990 A | 5/2013 |
| CN | 103675827 A | 3/2014 |
| CN | 103984357 A | 8/2014 |
| CN | 104007441 A | 8/2014 |
| CN | 104054115 A | 9/2014 |
| CN | 203888640 U | 10/2014 |
| CN | 104517096 A | 4/2015 |
| CN | 104743128 A | 7/2015 |
| CN | 104932524 A | 9/2015 |
| CN | 105138002 A | 12/2015 |
| CN | 105159297 A | 12/2015 |
| CN | 105203084 A | 12/2015 |
| CN | 105242276 A | 1/2016 |
| CN | 204946369 U | 1/2016 |
| CN | 105517666 A | 4/2016 |
| CN | 105531996 A | 4/2016 |
| KR | 20130009894 A | 1/2013 |

\* cited by examiner

METHOD AND SYSTEM FOR DISPLAYING OBSTACLE DETECTION

CROSS-REFERENCE TO RELATED APPLICATION

This application is a continuation application of International Application No. PCT/CN2016/098618, filed on Sep. 9, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to remote control technology and, more particularly, to a method and a system for displaying an obstacle detection for an unmanned aerial vehicle.

BACKGROUND

Unmanned aerial vehicles (UAVs), i.e., drones, have broad application areas and diverse application scenarios. In various situations, an unmanned aerial vehicle needs to fly in a complex space, such as flying between urban buildings and between mountain ridges. Correspondingly, real-time detection of obstacles around the unmanned aerial vehicle and real-time display of the obstructions to an operator are important for achieving a safe and smooth flight.

However, in conventional technologies, an obstacle detection system of unmanned aerial vehicle cannot intuitively and accurately provide an operator who operates the unmanned aerial vehicle with display of obstacles on a flight route, resulting in inconvenient operation of the unmanned aerial vehicle.

SUMMARY

In accordance with the disclosure, there is provided a method for displaying obstacle detection for an unmanned aerial vehicle (UAV). The method includes receiving obstacle information associated with at least one direction of the UAV. The obstacle information is obtained by analyzing a sensing signal of at least one sensor of the UAV. The method further includes displaying the obstacle information.

Also in accordance with the disclosure, there is provided a system for displaying obstacle detection for a UAV. The system includes a receiver, a processor, and a memory. The receiver is configured to receive obstacle information associated with at least one direction of the UAV. The obstacle information is obtained by analyzing a sensing signal of at least one sensor of the UAV. The memory stores machine-readable instructions that, when executed by the processor, cause the processor to control display of the obstacle information.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first assembly is referred to as "fixed to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed. The term "or" used herein may be inclusive, and may have a same meaning as the term "and/or".

Figure 1:
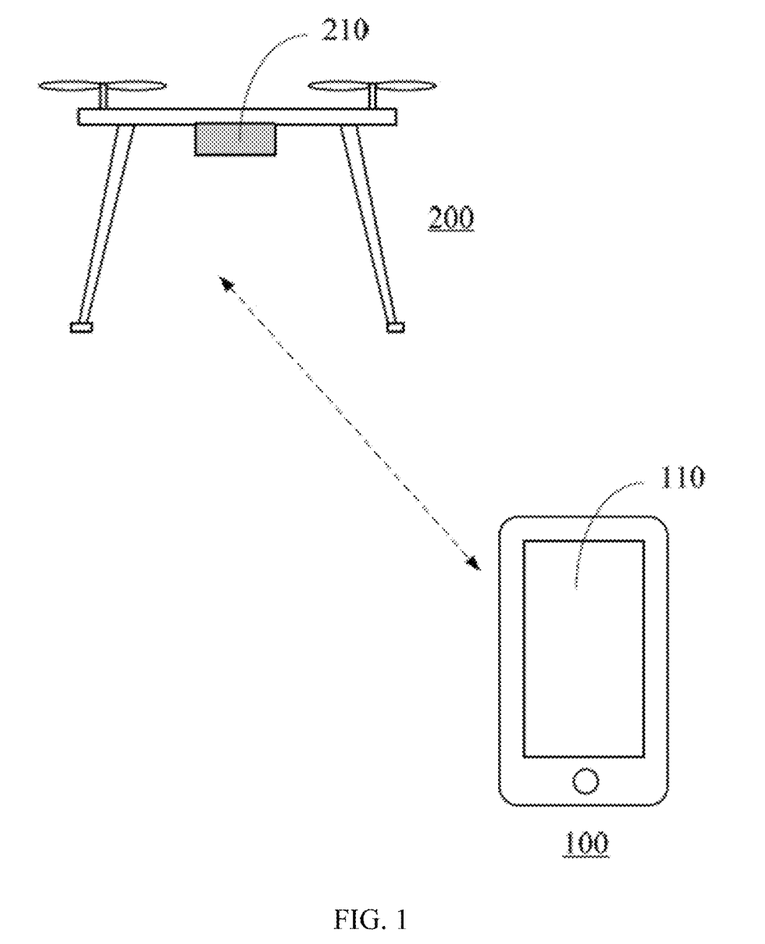
FIG. 1 illustrates an exemplary application scenario according to various disclosed embodiments of the present disclosure.

FIG. 1 illustrates an exemplary application scenario according to various disclosed embodiments of the present disclosure. As shown in FIG. 1, a user terminal 100 monitors a flight status of an unmanned aerial vehicle 200. The unmanned aerial vehicle 200 includes a sensor circuit 210. The sensor circuit 210 may include at least one sensor for receiving at least one sensing signal from at least one direction of the unmanned aerial vehicle 200. The sensing signal can be analyzed to obtain obstacle information associated with the corresponding direction. The obstacle information may be displayed on a display screen 110 of the user terminal 100, such that the user can monitor the flight status of the unmanned aerial vehicle 200 in real-time and control the unmanned aerial vehicle 200 to avoid obstacles on a flight route.

In the embodiments of the present disclosure, the user terminal 100 may be, for example, a mobile terminal such as a mobile phone or a tablet computer, on which a monitoring application program can be run to receive obstacle information from the unmanned aerial vehicle 200 and display the obstacle information on the display screen 110. In some embodiments, the user terminal 100 may be, for example, a universal remote control or a dedicated remote control of the unmanned aerial vehicle 200, and may include a hardware or a hardware circuit for receiving obstacle information from the unmanned aerial vehicle 200 and displaying the obstacle information on the display screen 110.

In some embodiments, the sensor circuit 210 may include at least one sensor for receiving at least one sensing signal from at least one direction of the unmanned aerial vehicle 200. For example, the sensor circuit 210 may include one sensor for detecting obstacles in front of the unmanned aerial vehicle 200. As another example, the sensor circuit 210 may include two sensors for detecting obstacles in front of or behind the unmanned aerial vehicle 200, respectively. As another example, the sensor circuit 210 may include four sensors for detecting obstacles in front of, behind, on the left of, and on the right of the unmanned aerial vehicle 200, respectively. As another example, the sensor circuit 210 may include five sensors for detecting obstacles in front of, behind, to the left of, to the right of, and above the unmanned aerial vehicle 200, respectively. As another example, the sensor circuit 210 may include seven sensors for detecting obstacles in front of, behind, on the left of, on the right of, above, in the front-left of, and in the front-right of the unmanned aerial vehicle 200, respectively. The sensors in the sensor circuit 210 may be implemented separately or may be integrated for implementation. In the present disclosure, detection directions of the sensors may be configured according to actual needs to detect obstacles in various directions or combinations of directions, and are not limited to the above-described examples.

In some embodiments, a sensor in the sensor circuit 210 may include, for example, an image sensor, a distance sensor, and/or a radar. By analyzing the sensing signal received by the sensor circuit 210, obstacle information associated with the corresponding direction can be obtained. Correspondingly, the obstacle information may include at least one of information from the image sensor, information from the distance sensor, and/or information from the radar. In some embodiments, the obstacle information may include at least one of presence information of the obstacle, a distance between the obstacle and the unmanned aerial vehicle 200, and/or relative orientation information between the obstacle and the unmanned aerial vehicle 200.

Figure 2:
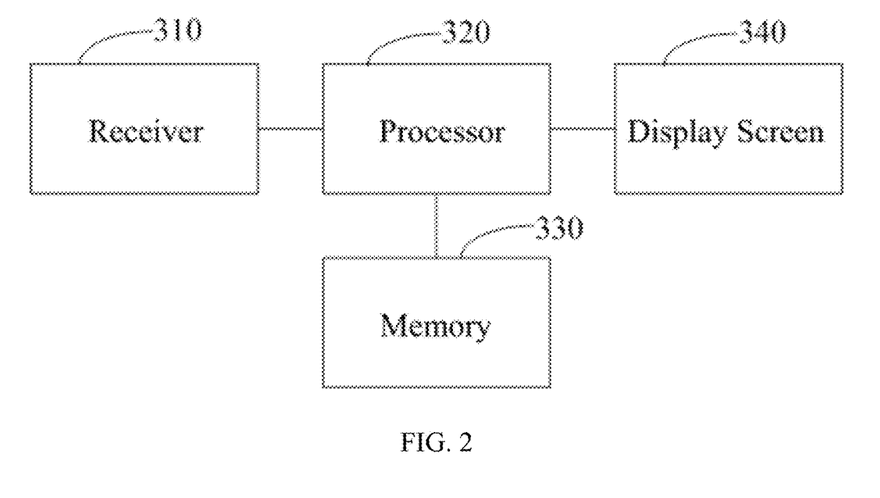
FIG. 2 illustrates a block diagram of an exemplary system for displaying an obstacle detection for an unmanned aerial vehicle according to various disclosed embodiments of the present disclosure.
Figure 3:
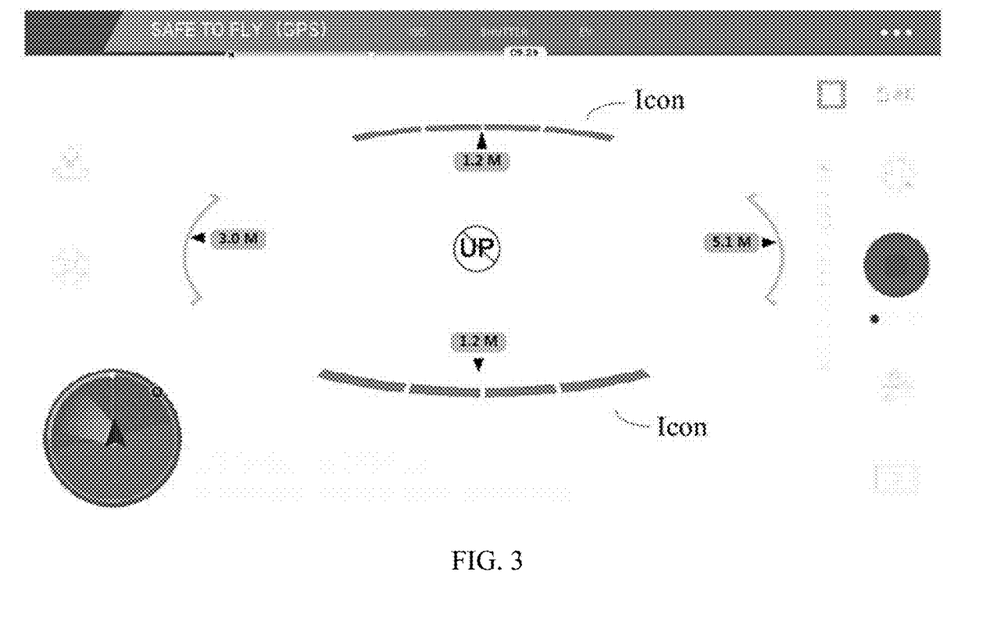
FIG. 3 illustrates an exemplary display interface on a display screen according to various disclosed embodiments of the present disclosure.

FIG. 2 illustrates a block diagram of an exemplary system 300 for displaying an obstacle detection for an unmanned aerial vehicle according to various disclosed embodiments of the present disclosure. The system 300 may be, for example, implemented in the user terminal 100. As shown in FIG. 3, the system 300 includes a receiver 310, a processor 320, a memory 330, and a display screen 340.

In some embodiments, the receiver 310 may receive obstacle information associated with at least one direction of the unmanned aerial vehicle 200. The obstacle information may be obtained by analyzing a sensing signal of the sensor circuit 210 mounted on the unmanned aerial vehicle 200. The sensor circuit 210 may include at least one sensor. The memory 330 stores machine-readable instructions. The processor 320 executes the instructions to control display of the obstacle information on the display screen 340.

In some embodiments, the at least one direction may include a forward and/or backward direction of the unmanned aerial vehicle 200. In some other embodiments, the at least one direction may include one or more directions other than the forward and backward directions of the unmanned aerial vehicle 200, e.g., a side direction, a left-front direction, a right-front direction, a left diagonal back direction, a right diagonal back direction, an upper direction.

In some embodiments, obstacle information associated with one or more directions may be detected and displayed, such that the operator can understand the environment around the unmanned aerial vehicle 200 intuitively and in real-time, and can adjust a flying speed and/or a flying route in time to achieve a safe and smooth flight.

FIG. 3 illustrates an exemplary display interface on a display screen according to various disclosed embodiments of the present disclosure. As shown in FIG. 3, obstacle information associated with the front, rear, left, right, and upper directions of the unmanned aerial vehicle 200 are displayed in a radial form. The display interface shows distance information and relative orientation information of each obstacle with respect to the unmanned aerial vehicle 200. In some embodiments, a number on the screen may indicate a distance between an obstacle and the unmanned aerial vehicle 200, and an arrow may indicate an orientation of the obstacle. In the example shown in FIG. 3, obstacles exist approximately 1.2 meters in front of, approximately 1.2 meters behind, approximately 3.0 meters to the left of, and approximately 5.1 meters to the right of the unmanned aerial vehicle 200. An obstacle also exists above the unmanned aerial vehicle 200.

In the example shown in FIG. 3, the five directions are merely for illustrative purposes and are not intended to limit the scope of the present disclosure. Information associated with more or less directions or other directions or direction combinations may be obtained and/or displayed according to various application scenarios. In some embodiments, in one or more displayed directions, one type of or a combination of several types of obstacle information selected from the follows may be displayed: presence of an obstacle, a distance between the obstacle and the unmanned aerial vehicle 200, or relative orientation information between the obstacle and the unmanned aerial vehicle 200.

By displaying in a radial manner, an actual space environment where the unmanned aerial vehicle 200 is located can be vividly simulated, thereby providing the operator with an intuitive feel. By displaying the distance and orientation of the obstacle with respect to the unmanned aerial vehicle 200 on the screen, it may be convenient for the operator to make a more accurate decision and to better control a flight route of the unmanned aerial vehicle 200. In some embodiments, a variety of directions or direction combination may be configured, and hardware resources may be used according to actual needs and terrain environment to achieve an optimized monitoring performance.

In some embodiments, a plurality of icons may be displayed in associate with one or more directions of the unmanned aerial vehicle 200, e.g., the front direction and/or the back direction of the unmanned aerial vehicle 200, but not limited thereto, as shown in FIG. 3. Further, according to the distance between the unmanned aerial vehicle 200 and the obstacle, a corresponding icon or icon combination may be displayed or highlighted. For example, when the distance between the unmanned aerial vehicle 200 and the obstacle is smaller than a preset threshold, e.g., 1.5 m, a green icon may be displayed. As the distance between the unmanned aerial vehicle 200 and the obstacle becomes increasingly close, a yellow icon may be displayed. When the distance becomes even closer, a red icon may be displayed. As another example, when the distance between the unmanned aerial vehicle 200 and the obstacle is smaller than a preset threshold, e.g., 1.5 m, an icon may be displayed, and as the distance between the unmanned aerial vehicle 200 and the obstacle becomes increasingly close, two icons may be displayed. When the distance becomes even closer, three icons may be displayed. Using an icon to indicate the distance between the unmanned aerial vehicle 200 and the obstacle may be more convenient, more intuitive, and easier for identification purposes than using a text prompt, and may be easier to catch the operator's attention when the distance is relatively close. Further, a change of the highlighted icon may be used to indicate a current flight direction of the unmanned aerial vehicle 200. For example, when the highlighted icon associated with a front direction is changed, it may indicate that the unmanned aerial vehicle 200 is flying forward. Similarly, when the highlighted icon associated with another direction is changed, it may indicate that the unmanned aerial vehicle 200 is flying toward that direction.

Figure 4:
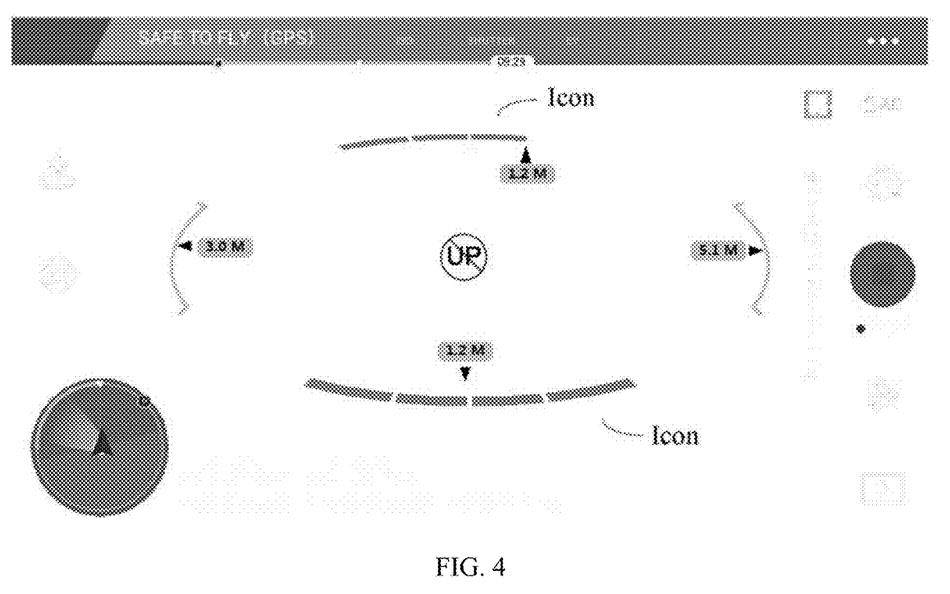
FIG. 4 illustrates another exemplary display interface on a display screen according to various disclosed embodiments of the present disclosure.

FIG. 4 illustrates another exemplary display interface on the display screen 340 according to various disclosed embodiments of the present disclosure. In some embodiments, for a selected direction of the unmanned aerial vehicle 200, e.g., a front direction, but not limited thereto, obstacle information received by the receiver 310 may include an offset of the obstacle relative to the direction. Correspondingly, one or more partitions may be displayed on the display screen 340, and the one or more partitions may be displayed differently according to an offset between the obstacle and a centerline of the selected direction. For example, as shown in FIG. 4, an obstacle exists in a front right direction of the unmanned aerial vehicle 200, and three of the four partitions in front of the unmanned aerial vehicle 200 are displayed. Accordingly, it may be easier for the operator to locate the obstacle.

Figure 5:
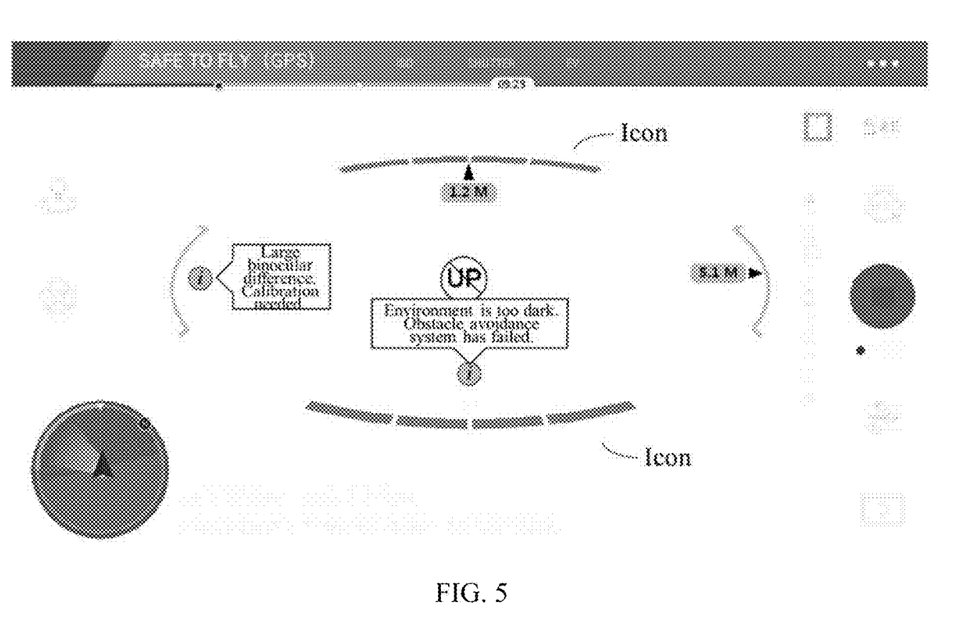
FIG. 5 illustrates another exemplary display interface on a display screen according to various disclosed embodiments of the present disclosure.

FIG. 5 illustrates another exemplary display interface on the display screen 340 according to various disclosed embodiments of the present disclosure. In some embodiments, the receiver 310 may receive warning or error information from the unmanned aerial vehicle. The warning or error information may include at least one of: information indicating that surrounding environment of the unmanned aerial vehicle is too dark, information indicating that a side of the unmanned aerial vehicle is blocked or too close to an obstacle, information indicating that an obstacle detection system for obtaining obstacle information needs a calibration, or other error information of the unmanned aerial vehicle or the obstacle detection system. The warning or error information may be displayed on the display screen 340. For example, as shown in FIG. 5, a left region of the screen shows "Large binocular difference. Calibration needed" and a bottom region of the screen shows "Environment is too dark. Obstacle avoidance system has failed." In some embodiments, warning or error information that is triggered later may be displayed with a higher priority, and previous warning or error information may be automatically collapsed, i.e., automatically hidden. When the user wishes to view the previous warning or error information, the user may click on an icon "i" to display hidden warning or error information. As such, the warning or error information may not occupy extra display areas, and may not hinder a display of other information.

Figure 6:
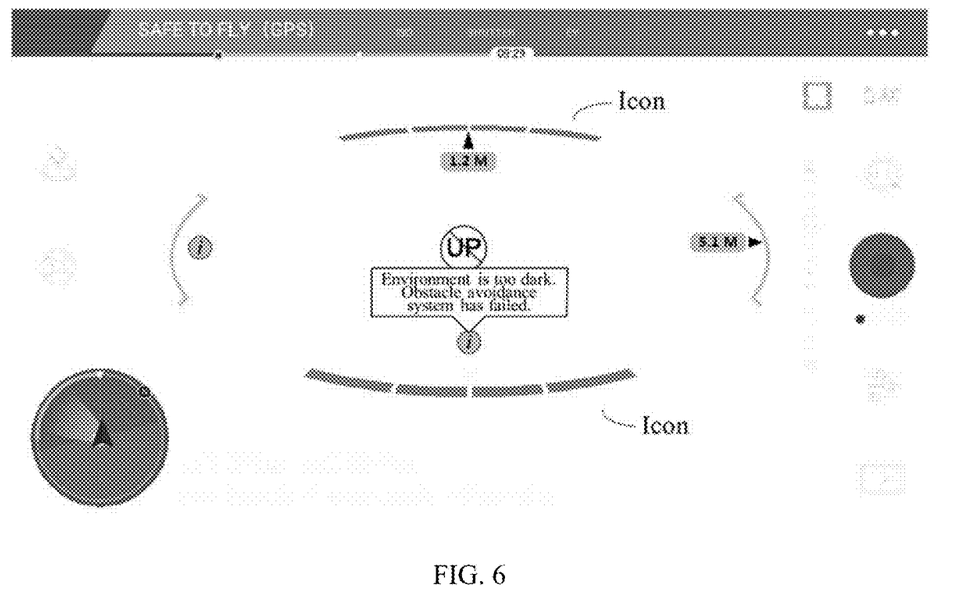
FIG. 6 illustrates another exemplary display interface on a display screen according to various disclosed embodiments of the present disclosure.

FIG. 6 illustrates another exemplary display interface on the display screen 340 according to various disclosed embodiments of the present disclosure. In some embodiments, when the warning or error information associated with a plurality of directions is the same, the warning or error information may be displayed in associate with only one of the directions. In the example shown in FIG. 6, the warning or error information in a left region and a bottom region of the screen is the same, and hence only the warning or error information in the bottom region is displayed. Thus, when warning or error information associated with a plurality of directions is the same, in order to determine the warning or error information, the user may not need to read information associated with each one of the plurality of directions. In some embodiments, the warning or error information may be no longer displayed after an abnormal state corresponding to the warning or error information is eliminated.

Figure 7:
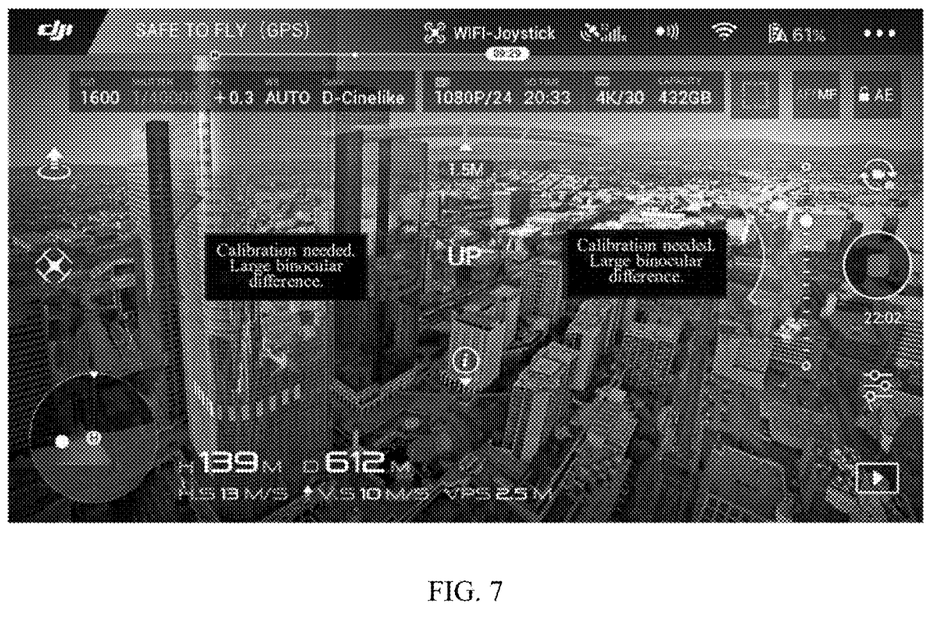
FIG. 7 illustrates another exemplary display interface on a display screen according to various disclosed embodiments of the present disclosure.

FIG. 7 illustrates another exemplary display interface on the display screen 340 according to various disclosed embodiments of the present disclosure. In some embodiments, obstacle information may be superimposed on a real-time image in a corresponding direction. Correspondingly, when the obstacle information is displayed, the operator can view the actual environment where the unmanned aerial vehicle 200 is located, can determine position and size of the obstacle relatively easily, and can adjust the flight route reasonably.

Figure 8:
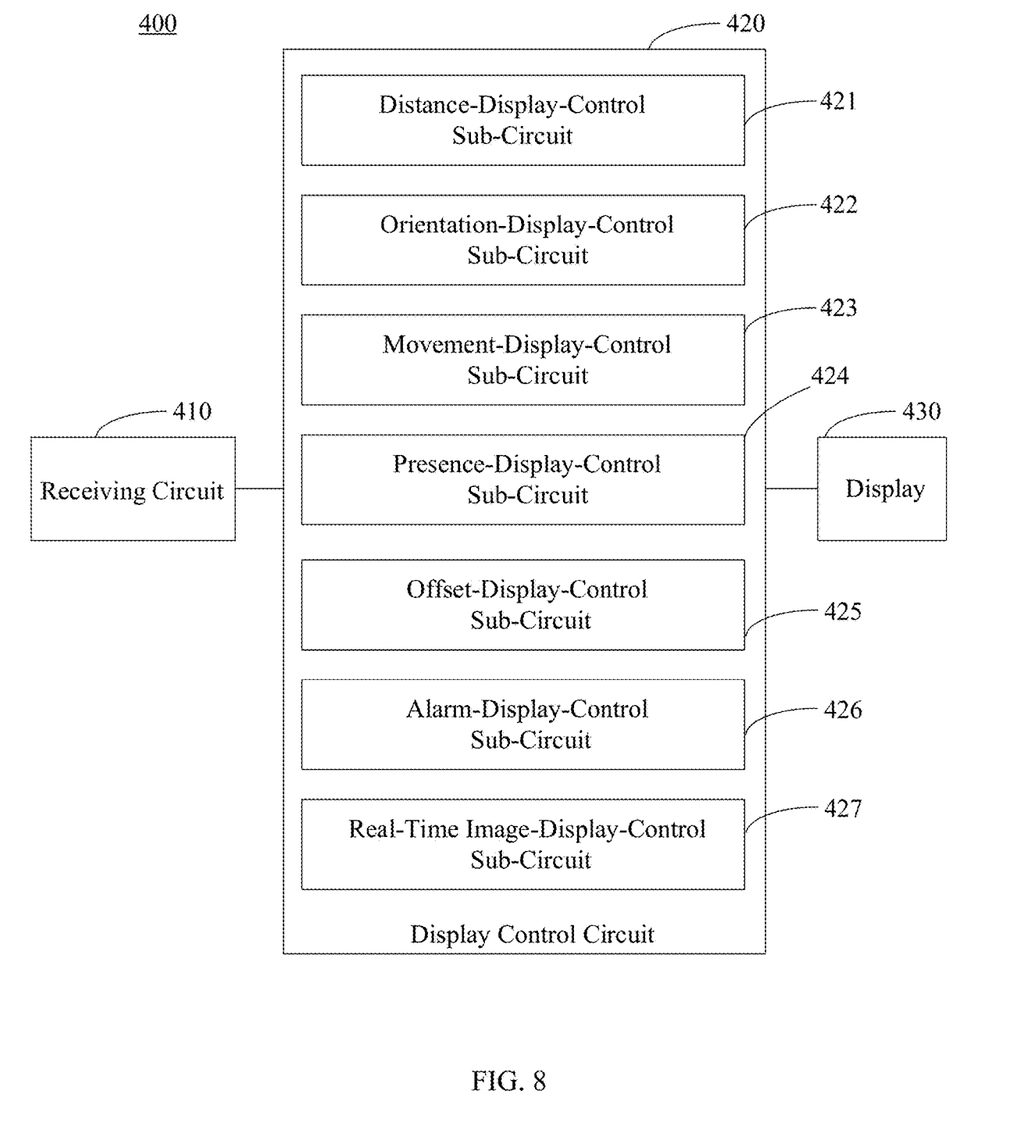
FIG. 8 illustrates a block diagram of another exemplary system for displaying an obstacle detection for an unmanned aerial vehicle according to various disclosed embodiments of the present disclosure.

FIG. 8 illustrates a block diagram of another exemplary system 400 for displaying an obstacle detection for an unmanned aerial vehicle according to various disclosed embodiments of the present disclosure. The system 400 may be, for example, implemented in the user terminal 100. As shown in FIG. 8, the system 400 includes a receiving circuit 410, a display control circuit 420, and a display 430.

In some embodiments, the receiving circuit 410 may receive obstacle information associated with at least one direction of the unmanned aerial vehicle 200. The obstacle information may be obtained by, for example, analyzing a sensing signal of at least one sensor mounted on the unmanned aerial vehicle. The display control circuit 420 may control the display of the obstacle information on the display 430, as described above with reference to FIGS. 3 to 7.

Various means may be used to implement the receiving circuit 410, the display control circuit 420, and the display 430, all of which are within the scope of the present disclosure. For example, the receiving circuit 410 may include a communication device, such as a transceiver or a receiver. The display control circuit 420 may include, for example, a processor configured to executing instructions consistent with the disclosure, or by another hardware or firmware, e.g., a programmable gate array or an application specific integrated circuit, etc. The display 430 may include, for example, a display screen.

In some embodiments, the at least one direction may include a direction other than the front and back directions of the unmanned aerial vehicle 200. In some embodiments, the at least one direction may include a side direction and/or an upper direction of the unmanned aerial vehicle 200. In some embodiments, the at least one direction may include a front direction and/or a back direction of the unmanned aerial vehicle 200. Further, the at least one direction may include a plurality of directions. In some embodiments, displaying the obstacle information may include displaying the obstacle information associated with the plurality of directions of the unmanned aerial vehicle 200 in a radial form.

According to the embodiments of the present disclosure, the obstacle information may at least include the distance between the obstacle and the unmanned aerial vehicle 200 and/or the relative orientation information of the obstacle with respect to the unmanned aerial vehicle 200. As shown in FIG. 8, the display control circuit 420 includes a distance-display-control sub-circuit 421 configured to control the display of the distance between the obstacle and the unmanned aerial vehicle 200. Further, the display control circuit 420 includes an orientation-display-control sub-circuit 422 configured to control the display of the relative orientation information of the obstacle with respect to the unmanned aerial vehicle 200, as described above with reference to FIG. 3. For example, the orientation-display-control sub-circuit 422 may display an arrow on the screen to indicate the relative orientation information of the obstacle with respect to the unmanned aerial vehicle 200.

In some embodiments, the distance-display-control sub-circuit 421 may control the display of a plurality of icons associated with a certain direction. One or more corresponding icons or icon combinations of the plurality of icons may be displayed or highlighted according to the distance. For example, when the distance between the unmanned aerial vehicle 200 and the obstacle is less than a preset threshold, the icons may be displayed or highlighted, as described above with reference to FIG. 3.

In some embodiments, the display control circuit 420 may include a movement-display-control sub-circuit 423 configured to control the display of a flying direction of the unmanned aerial vehicle 200. For example, the movement-display-control sub-circuit 423 may change a plurality of icons associated with a direction to indicate that the unmanned aerial vehicle 200 is flying in the direction, as described above with reference to FIG. 3.

In some embodiments, the display control circuit 420 may include a presence-display-control sub-circuit 424 configured to control the display of presence information of the obstacle. In the example shown in FIG. 3, the presence-display-control sub-circuit 424 controls the display of an icon including text "UP" and a "no" symbol, i.e., a circle-backslash symbol, indicating that there is an obstacle above the unmanned aerial vehicle 200.

In some embodiments, the obstacle information may include an offset of the obstacle relative to a selected direction and, as shown in FIG. 8, the display control circuit 420 further includes an offset-display-control sub-circuit 425 configured to control the display of one or more partitions on a display screen. The one or more partitions may be displayed differently according to the offset of the obstacle relative to a centerline of the selected direction, as described above with reference to FIG. 4.

In some embodiments, the receiving circuit 410 may receive a warning or error information from the unmanned aerial vehicle 200. The warning or error information may include at least one of: information indicating that surrounding environment of the unmanned aerial vehicle 200 is too dark, information indicating that a side of the unmanned aerial vehicle 200 is blocked or too close to an obstacle, information indicating that an obstacle detection system for obtaining obstacle information needs a calibration, or other error information of the unmanned aerial vehicle 200 or the obstacle detection system. The display control circuit 420 may include an alarm-display-control sub-circuit 426 configured to control the display of the warning or error information.

In some embodiments, as described above with reference to FIG. 5, when the alarm-display-control sub-circuit 426 controls the display of warning or error information associated with one or more directions of the at least one direction, warning or error information that is triggered later may be displayed with a higher priority, and the previous warning or error information may be automatically collapsed, i.e., automatically hidden. When a user instruction is received, the hidden warning or error information may be displayed.

In some embodiments, as described above with reference to FIG. 6, if warning or error information associated with a plurality of directions is the same, the warning or error information may be displayed only in association with one of the plurality of directions.

In some embodiments, the warning or error information may be no longer displayed after an abnormal state corresponding to the warning or error information is eliminated.

In some embodiments, as shown in FIG. 8, the display control circuit 420 includes a real-time image-display-control sub-circuit 427 configured to control the display of a real-time image corresponding to the direction associated with the obstacle information. The obstacle information may be superimposed on the real-time image as described above with reference to FIG. 7.

Consistent with the present disclosure, there is provided a non-transitory machine-readable medium having machine-readable instructions stored therein. A processor may execute the instructions to implement a method consistent with the disclosure, such as one of the above-described methods.

Consistent with the present disclosure, a flight process of the unmanned aerial vehicle may be safer, obstacles in a plurality of directions may be detected, and the display of obstacle information may be clearer and more intuitive. Further, the obstacle information may be displayed in a perspective manner in a main camera interface, facilitating a direction identification. An arrow may be displayed to indicate a position of a current obstacle, and a number may be displayed to indicate distance information for a distance between the obstacle and the unmanned aerial vehicle, such that the user may control the unmanned aerial vehicle to, e.g., adjust flight angles, to easily avoid the obstacle.

Those of ordinary skill in the art will appreciate that the exemplary elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of exemplary systems, devices, and units may be omitted and references can be made to the descriptions of the exemplary methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method for displaying obstacle detection for an unmanned aerial vehicle (UAV), comprising:
   receiving obstacle information associated with a plurality of directions of the UAV, the obstacle information being obtained by analyzing sensing signals of a plurality of sensors of the UAV and including an offset between a first obstacle and a centerline of a first direction of the plurality of directions; and
   displaying, on a display screen, the obstacle information, including;
      displaying one or more first partitions and a first location indicator at an end of the one or more first partitions, the first location indicator being configured to indicate a first distance between the UAV and the first obstacle; and
      displaying one or more second partitions and a second location indicator at a midpoint of the one or more second partitions, the second location indicator being configured to indicate a second distance, between the UAV and a second obstacle, associated with a second direction of the plurality of directions, wherein, when the second location indicator shows the second distance being identical to the first distance, a first number of the displayed one or more first partitions is different from a second number of the displayed one or more second partitions to indicate the first obstacle being associated with the offset; and
      wherein the one or more first partitions and the one or more second partitions comprise a plurality of icons of similar shape arranged radially on the display screen.

2. The method according to claim 1, wherein:
   the obstacle information includes a distance between an obstacle and the UAV and a relative orientation between the obstacle and the UAV.

3. The method according to claim 2, wherein displaying the obstacle information includes displaying the obstacle information associated with the plurality of directions of the UAV in a radial form.

4. The method according to claim 1, wherein the obstacle information includes at least one of presence information of an obstacle or a distance between the obstacle and the UAV.

5. The method according to claim 1, wherein the obstacle information includes at least one of information from an image sensor, information from a distance sensor, or information from a radar.

6. The method according to claim 1, wherein, for a selected direction of the plurality of directions:
   the obstacle information includes a distance between an obstacle and the UAV; and
   displaying the obstacle information includes displaying a plurality of icons in the selected direction, and highlighting one of the plurality of icons or a combination of multiple ones of the plurality of icons according to the distance.

7. The method according to claim 6, further comprising:
   highlighting the one of the plurality of icons or the combination of multiple ones of the plurality of icons in response to the distance between the obstacle and the UAV being less than a preset threshold.

8. The method according to claim 1, further comprising:
   receiving warning or error information from the UAV, the warning or error information including at least one of:
      information indicating that a surrounding environment of the UAV is below a darkness level,
      information indicating that a side of the UAV is blocked or below a distance level from an obstacle,
      information indicating that an obstacle detection system for obtaining the obstacle information needs a calibration, or
      error information associated with the UAV or the obstacle detection system; and
   displaying the warning or error information.

9. The method according to claim 8, wherein:
   the warning or error information is associated with a selected direction of the plurality of directions, and displaying the warning or error information includes:
      displaying subsequent warning or error information with a higher priority and automatically hiding precedent warning or error information; and
      displaying hidden warning or error information according to a user instruction; or
   displaying the warning or error information includes, if the warning or error information associated with multiple ones of the plurality of directions is identical, displaying only the warning or error information associated with one of the multiple ones of the plurality of directions;
   the method further comprising:
      stopping displaying the warning or error information after an abnormal state corresponding to the warning or error information is eliminated.

10. The method according to claim 1, further comprising:
displaying a flight direction of the UAV; and
displaying an arrow to indicate a relative orientation of an obstacle with respect to the UAV;
wherein displaying the obstacle information includes superimposing the obstacle information on a real-time image.

11. A system for displaying obstacle detection for an unmanned aerial vehicle (UAV), comprising:
a receiver configured to receive obstacle information associated with a plurality of directions of the UAV, the obstacle information being obtained by analyzing sensing signals of a plurality of sensors of the UAV and including an offset between a first obstacle and a centerline of a first direction of the plurality of directions;
a processor; and
a memory storing machine-readable instructions that, when executed by the processor, cause the processor to control display of the obstacle information, including;
controlling display of one or more first partitions and a first location indicator at an end of the one or more first partitions, the first location indicator being configured to indicate a first distance between the UAV and the first obstacle; and
controlling display of one or more second partitions and a second location indicator at a midpoint of the one or more second partitions, the second location indicator being configured to indicate a second distance, between the UAV and a second obstacle, associated with a second direction of the plurality of directions, wherein, when the second location indicator shows the second distance being identical to the first distance, a first number of the displayed one or more first partitions is different from a second number of the displayed one or more second partitions to indicate the first obstacle being associated with the offset; and
wherein the one or more first partitions and the one or more second partitions comprise a plurality of icons of similar shape arranged radially on the display screen.

12. The system according to claim 11, wherein:
the obstacle information includes a distance between an obstacle and the UAV and a relative orientation between the obstacle and the UAV.

13. The system according to claim 11, wherein for a selected direction of the plurality of directions:
the obstacle information includes a distance between an obstacle and the UAV; and
the instructions further cause the processor to control display of a plurality of icons in the selected direction, and highlight one of the plurality of icons or a combination of multiple ones of the plurality of icons according to the distance.

14. The system according to claim 11, wherein:
the receiver further receives warning or error information from the UAV, the warning or error information including at least one of:
information indicating that a surrounding environment of the UAV is below a darkness level,
information indicating that a side of the UAV is blocked or below a distance level from an obstacle,
information indicating that an obstacle detection system for obtaining the obstacle information needs a calibration, or
error information associated with the UAV or the obstacle detection system; and
the instructions further cause the processor to control display of the warning or error information.

15. The system according to claim 11, wherein the instructions further cause the processor to superimpose the obstacle information on a real-time image.

16. The system according to claim 11, further comprising:
a display screen configured to display the obstacle information.

* * * * *